United States Patent [19]
Harbon et al.

[11] 4,252,015
[45] Feb. 24, 1981

[54] WELLBORE PRESSURE TESTING METHOD AND APPARATUS

[75] Inventors: Donald C. Harbon, Salt Lake City, Utah; Charles W. Morris, Santa Fe Springs, Calif.; Cleve D. Javine, Bartlesville, Okla.

[73] Assignee: Phillips Petroleum Company, Bartlesville, Okla.

[21] Appl. No.: 50,283

[22] Filed: Jun. 20, 1979

[51] Int. Cl.³ .............................................. E21B 47/06
[52] U.S. Cl. ........................................ 73/151; 73/302
[58] Field of Search ................. 73/151, 155, 302, 706, 73/714

[56] References Cited

U.S. PATENT DOCUMENTS

| | | | |
|---|---|---|---|
| 2,223,913 | 12/1940 | Johnston | 234/20 |
| 2,855,780 | 10/1958 | Edwards | 73/714 |
| 3,712,129 | 1/1973 | Rhoades | 73/151 |
| 3,964,305 | 6/1976 | Wray et al. | 73/151 |
| 4,010,642 | 3/1977 | McArthur | 73/151 |
| 4,052,903 | 10/1977 | Thordarson | 73/406 |

OTHER PUBLICATIONS

Considine, D. M., Process Instruments . . . Handbook, McGraw-Hill Book Co., Inc., New York, 1957, pp. 3-26 thru 3-28.

*Primary Examiner*—Jerry W. Myracle

[57] ABSTRACT

An apparatus for sensing the pressure of a well fluid in a subsurface wellbore in which a first, elongated tubing is adapted to extend from the surface of the earth to a subsurface location at which the pressure is to be measured, a fluid receiving chamber is disposed on the lower end of the first tubing, a second, elongated tubing, of smaller cross-section than the first, is disposed in the first tubing with its upper end at the surface of the earth and its lower end sealed within the lower end of the first tubing or the upper end of the fluid receiving chamber and is adapted to receive a pressure transmitting fluid and to be placed in fluid communication with the fluid receiving chamber and a pressure responsive closure element closes the lower end of the first tubing, the upper end of the fluid receiving chamber or the lower end of the fluid receiving chamber and is adapted to open at a pressure above the pressure of the well fluid and permit the pressure of the well fluid to be balanced against the pressure of the pressure transmitting fluid within the fluid receiving chamber. A method of sensing the fluid pressure at a subsurface location in a wellbore is also disclosed in which a pressure transmitted fluid is disposed in the second tubing, the pressure of the pressure transmitting fluid is increased to a pressure sufficient to open the closure, the pressure of the pressure transmitting fluid is balanced against the pressure of the well fluid in the fluid receiving chamber and the pressure of the pressure transmitting fluid is sensed at the surface of the earth.

19 Claims, 5 Drawing Figures

WELLBORE PRESSURE TESTING METHOD AND APPARATUS

BACKGROUND OF THE INVENTION

The present invention relates to a method and apparatus for testing the pressure in subterranean wellbores. More particularly, the present invention relates to a method and apparatus for testing the pressure in producing subterranean wellbores. In a still more specific aspect, the present invention relates to a method and apparatus for testing the presence in a producing, subterranean geothermal wellbore.

The recovery of fluid from subterranean reservoirs involves a wide variety of techniques. Petroleum is most often produced by depending upon the fact that the fluid is contained in the reservoir under high pressure, and, when the reservoir is penetrated by a wellbore and the pressure released, the petroleum will be driven to the surface of the earth for recovery by natural pressure, such as a bottom water drive, solution gas drive and the like. To the extent that reservoir pressure is insufficient to drive the oil to the surface or the reservoir has been depleted to the extent that the pressure is insufficient, the well will normally be put on pump or vacuum to produce further amounts of oil. All these techniques are generally referred to as "primary" recovery techiques. Once the reservoir has reached its limits of production by such primary recovery techniques, it is necessary to supplement the natural reservoir pressures or in some other manner drive the oil from the reservoir. For example, water flooding as well as the injection of various gases at low pressure are resorted to to displace oil from the reservoir. While these techniques do recover additional amounts of oil, they have proven to be highly inefficient, thus giving rise to the development of more sophisticated techniques of recovery such as the injection of gas at high pressure to create a zone of miscibility between the drive gas and the oil, the injection of a small slug of propane or the like followed by a gas to create a miscible displacement at lower pressures, the injection of a variety of oil-miscible solvents followed by a gas or, in the case of highly viscous oils, the passage of a flame front through the reservoir. All of these techniques are commonly referred to as "secondary" recovery techniques. Following the practice of a secondary recovery technique, such as water flooding, still further recovery of oil can be attained by the so-called "tertiary" recovery techniques. These techniques generally involve the injection of a solvent, such as a surfactant, or a polymeric material which id mutually miscible with oil and water and driving the slug through the reservoir by water. In some instances, it is also common, when the oil is highly viscous, to utilize a viscous polymeric material to improve recovery.

Because of the decline of oil reserves, interest in geothermal reservoirs, such as hot water and stream reservoirs, as a source of energy has increased significantly. In the production of fluids from geothermal reservoirs, the inherent high pressure of the reservoir, in its natural state, is again depended upon to produce fluids from the reservoir and essentially the same primary recovery techniques employed in oil recovery are utilized.

Obviously the most important factor in a production of fluids from subterranean reservoirs is timely and accurate information concerning the pressure of the fluids in the reservoir. While some information can be obtained from pressures at the surface of the well bore, the most useful information is obtained by measuring the pressure adjacent the production formation. Further, while wellbore pressure information under static or shut-in conditions is valuable, the most valuable information is obtained by pressure measurements obtained while the well is on production. For example, reservoir potential can be predicted by using pressure drawdown and buildup data in a producing well and the productivity of the formation can be evaluated in a producing well. The reservoir characteristics and fluid properties obtained from pressure data can be utilized in numerous other ways, for example, pressure information facilitates the design of surface and subsurface producing equipment. Detailed pressure information prior to production is also helpful in determining the best rate of production and estimating the life of the reservoir. In addition, producing and injection well pressures are necessary and in the design and operation of secondary and tertiary recovery techniques.

Numerous methods are available for determining pressures at various depths in a wellbore. In general, an automatically recording, pressure-sensitive sonde may be introduced into the well by means of a wire line and then withdrawn and the recorded pressures observed. In a similar technique, a pressure sensitive sonde or sub can be lowered into the well on a wire line and the pressure data transmitted to the surface through an electrical line. These wire line techniques have the advantage that they can be run in a producing well, through a well control device, such as a stuffer box. However, instruments of this variety are not only expensive but are quite delicate and will generally be incapable of withstanding adverse environmental conditions such as high temperatures, high producing rates and high pressures. It is also known to lower a pressure sensitive element to the desired depth in the well and transmit the pressure information to the surface through a column of fluid of known density. Here again, the pressure sensitive equipment is not adapted to use in harsh environments and the accuracy of the measurement is open to some question. It is also possible to lower a device into the well to take a sample of subsurface fluid and retrieve the sample chamber with the fluid under the pressure at which the sample was taken. In this technique the lack of adaptability to harsh conditions and accuracy are also problems. Finally, techniques have been developed for balancing the well pressure at a given depth against a column of gas. While this technique has numerous advantages over those previously discussed, due to its relative simplicity, numerous problems are also inherent. For example, the placement of the equipment in the reservoir is a problem, the equipment generally lacks flexibility in adapting the same to wide pressure variations and the equipment lacks adaptability to severe conditions of high temperatures, flow rates and pressures. The most common technique of utilizing this method involves attaching the equipment to the bottom of a conventional string of tubing as a sub or sonde and running the small open-ended tubing, for carrying the pressure transmitting gas, along the outside of the conventional tubing. In the last instance, the techniques for utilizing the equipment contribute to the difficulty of placing the equipment in the well, to the extent that the pressure transmitting gas in the small or microtubing is introduced until all reservoir fluid is displaced from the open ended tubing and an indication of complete displacement is dependent upon the gas bubbling out the bottom of the tubing. The latter is generally observed by a flattening of the pressure curve or an essentially constant pressure observation. Here again the accuracy in determining this point becomes questionable in many cases. Finally, most of the pressure balancing type of pressure measuring equipment as well as the other types, aside from the wire line type, are mounted in the reservoir as a permanent installation. While this has advantages of providing pressure information throughout the life of the reservoir, it is disadvantageous to the extent that it must be installed prior to initiation of production of the well or the well must be shut down and often times of equipment, such as certain parts of pumping equipment, must be removed temporarily and then replaced after the pressure sensing equipment is placed.

The previously mentioned disadvantages of conventional pressure testing equipment are exaggerated even more when such devices are to be utilized in geothermal wells. In these cases, the harsh conditions of high temperatures, high flow rates and high pressures make running, and use of the equipment difficult and the dependability highly questionable.

It is therefore an object of the present invention to provide an improved method and apparatus for pressure testing in a subterranean wellbore which overcomes the above mentioned problems of the prior art. Another object of the present invention is to provide an improved pressure testing method and apparatus which can be utilized under adverse environmental conditions of high temperatures, high pressures and/or high flow rates. Yet another object of the present invention is to provide an improved method and apparatus for testing wellbore pressures which produces highly accurate results. Another and further object of the present invention is to provide an improved method and apparatus for pressure testing in a wellbore which requires no specialized components and is economical in construction and use. Another object of the present invention is to provide an improved method and apparatus for pressure testing in a wellbore which can be utilized on a temporary or permanent basis. Still another object of the present invention is to provide an improved pressure testing method and apparatus for a wellbore which can be conveniently introduced into a producing well through conventional well control equipment. Yet another object of the present invention is to provide an improved pressure testing method and apparatus for a wellbore which can be introduced into the well without interference with other well equipment and/or being interfered with by other well equipment. Another and further object of the present invention is to provide an improved method and apparatus for pressure testing in a wellbore which is capable of simple modification to permit it adaptation to a variety of different conditions, particularly large pressure fluctuations. Yet another object of the present invention is to provide an improved method and apparatus for testing pressure in a wellbore by a pressure balancing technique in which the apparatus can be introduced into the well in a sealed condition, placed in operation in a simple manner and leaves no doubt as to the time at which pressure measurements can be initiated. These and other objects of the present invention will become apparent from the following description.

SUMMARY OF THE INVENTION

In accordance with the present invention, apparatus for sensing the pressure of a well fluid in a fluid producing subsurface well comprises a first elongated tubing means adapted to be disposed in the wellbore with its upper end located at the surface of the earth and its lower end at a point adjacent the point at which the pressure is to be sensed, a second elongated tubing means of smaller cross section than the first rubing, disposed within the first tubing and essentially coextensive with the first tubing, a fluid receiving chamber means disposed on the lower end of the first tubing and adapted to communicate with the lower end of the second tubing and the well fluid and a pressure responsive closure means disposed within one of the second tubing and the fluid receiving chamber and adapted to open at a pressure above the pressure of the well fluid and permit the well fluid to be balanced against the pressure transmitting fluid in the fluid receiving chamber. In its preferred embodiment, the first and second tubing are flexible tubing, the fluid receiving chamber is of substantially the same diameter as the first tubing and the pressure responsive closure means is a frangible disc means adapted to be ruptured when a pressure greater than the pressure of the well fluid is applied thereto. In use, a pressure transmitting fluid is sealed within the second tubing, the fluid receiving chamber and the first and second tubing are run into the well to a point adjacent the point at which the fluid pressure is to be sensed, the pressure of the pressure transmitting fluid is increased to a pressure sufficient to open the closure means, the pressure of the well fluid is balanced against the pressure of the pressure transmitting fluid in the fluid receiving chamber and the pressure of the pressure transmitting fluid is sensed at the surface of the earth.

DESCRIPTION OF THE PREFERRED EMBODIMENT

Figure 1:
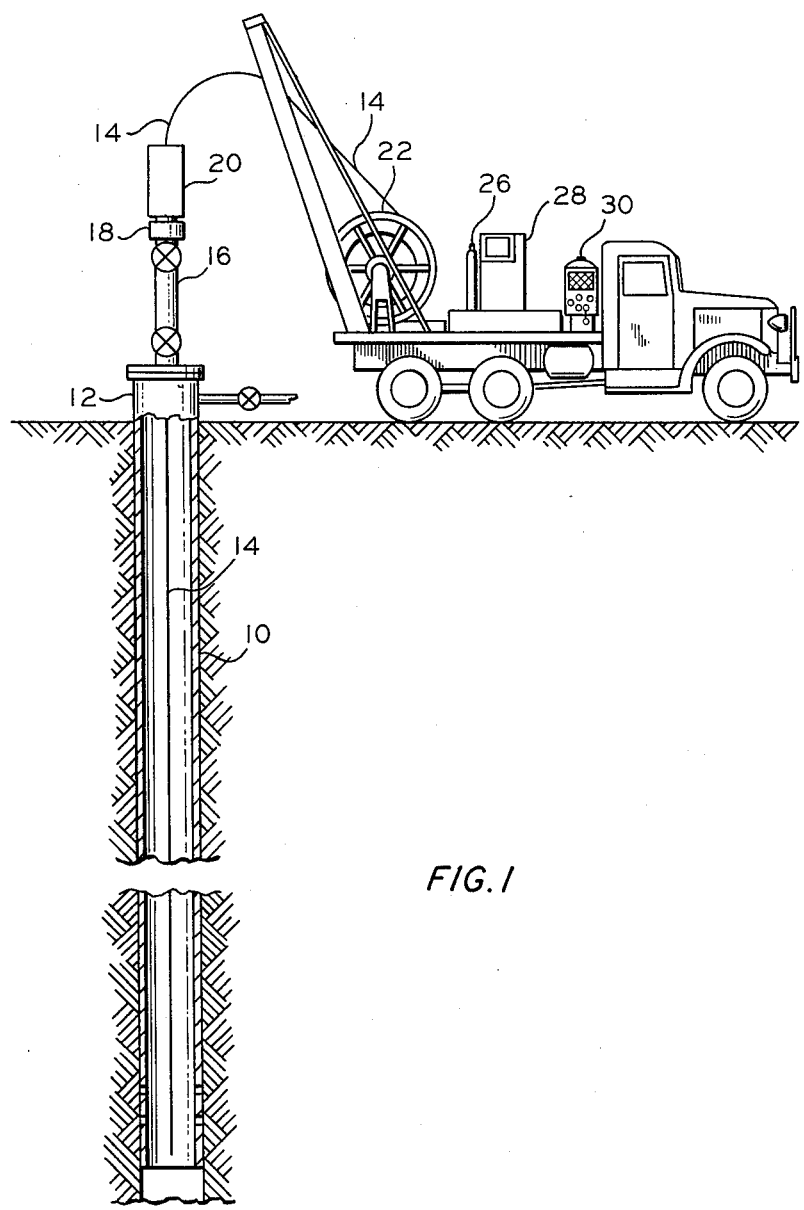
FIG. 1 is a schematic view partially in section of the apparatus of the present invention being run into a subsurface wellbore.

In accordance with FIG. 1, an overall schematic view of the apparatus of the present invention is shown being run into a subsurface wellbore. In FIG. 1, the wellbore is provided with a casing 10 terminating at its upper end in a wellhead 12. For the purpose of running the pressure sensing apparatus of the present invention into the well, a stuffer box means 16 is mounted on the wellhead 12 and is provided with a packer means 18. Stuffer box 16 or an equivalent well control means is utilized in order to run the apparatus 14 into a producing well without interruption of fluid production from the well. However it is obvious that the apparatus can be run in a well prior to completion of the well for production and that such apparatus can be temporarily or permanently disposed in a nonproducing or a producing well. In any event the pressure testing apparatus 14 is made up of a flexible tubing which can be inserted into the well by a means such as a Bowen Continuous String Coiled Tubing Unit sold by Bowen Tools Inc. of Houston, Texas, which has a hydraulic injector head 20 and a tubing reel 22 which may be appropriately mounted on a truck, as shown, thereby making the apparatus for running and operating the testing equipment 14 portable. However, as will be apparent from the more detailed description, such portability is convenient but not necessary. The pressure transmitting fluid for the testing apparatus 14 is also disposed at the surface of the earth and may be a pressurized gas cylinder 26, containing a pressurized gas such as nitrogen. A pressure control and pressure measuring means 28 is also provided at the surface of the earth to control the introduction of pressure transmitting fluid into testing apparatus 14 and to measure the pressure of the pressure transmitting fluid. A power unit 30 may also be provided for lowering and raising testing apparatus 14 into and out the wellbore.

Figure 2:
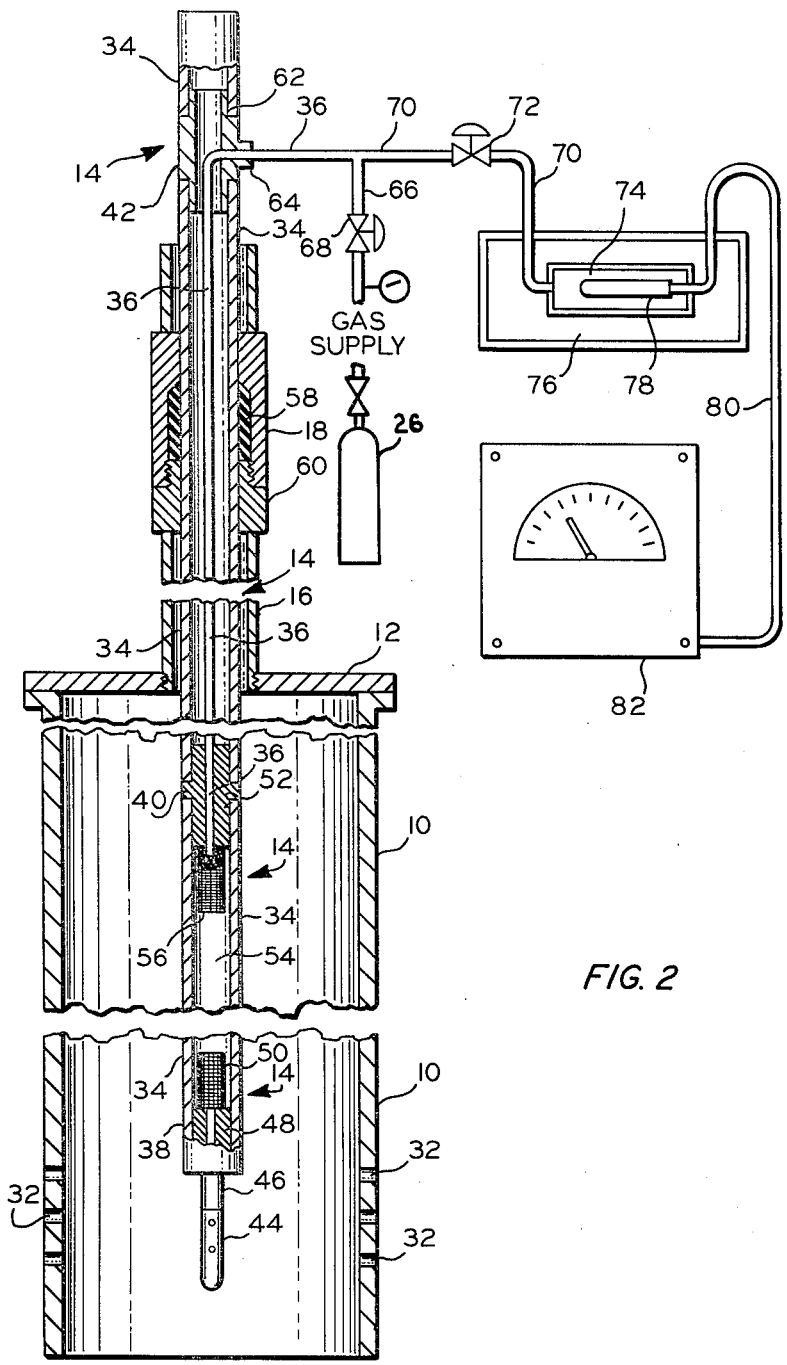
FIG. 2 is a more detailed view partially in section of the subsurface and surface apparatus of the present invention.

FIG. 2 of the drawings shows, in somewhat greater detail, the surface equipment utilized in conjunction with the apparatus of the present invention and the testing means 14 mounted in the casting 10. The casing 10 may be conventionally cemented into the subsurface well and provided with perforations 32 communicating with a fluid producing formation. The testing means 14 comprises an outer tubing 34 extending from the surface of the earth to the subsurface location where the pressure is to be sensed. Passing through the interior of the tubing 34 is a second string of tubing 36, of smaller diameter than tubing 34 and terminating at a point above the bottom of tubing 34. Tubing 34 and tubing 36 are preferably flexible tubing, thereby permitting the running of the testing means 14 into a producing well through a well control means such as stuffer box means 16, in a manner similar to running wire line apparatus into a producing well. Obviously, the testing means 14 could be permanently mounted in the casing 10 and wellhead 12, prior to completion of the well by cementing and perforating casing 10 in the well. For convenience of illustration and description, the testing means 14 can be divided into a lower portion 38, an intermediate portion 40 and an upper portion 42. Lower portion 38 includes a perforated, tubular nose section 44, for transmitting well fluid from the casing 10 into the apparatus, and a pressure responsive means 46 adapted to be opened at a pressure above the pressure of the well fluid, thereby providing communication between perforated tubing 44 and tubing 34. Pressure responsive closure 46 is mounted on tubing 34 by means of annular mounting means 48, having a central opening communicating with the closure means 14 and the interior of tubing 34. Mounted over the opening in mounting means 48 is a filter means 50, such as a screen, adapted to prevent the entry of dirt and other debris into the tubing 34. Intermediate portion 40 of tubing means 14 includes annular mounting means 52 which annularly seals the lower end of tubing 36 within tubing 34 with the open end of tubing 36 in open communication with a fluid receiving chamber 54 formed between lower portion 38 and intermediate portion 40. As will be obvious later, from the more detailed FIGS. 3 and 4, the closure means 46 may be connected to perforated tubing element 44 and mounting means 48 by screwing or welding, thus making it convenient to remove and replace the closure means section 46. Similarly, the section of tubing 34 which forms the fluid receiving chamber 54 is welded, threadably secured or otherwise mounted so that this section may be removed and replaced with a shorter or longer section of tubing 34 to thereby diminish or enlarge fluid receiving chamber 54 to fit the conditions anticipated in the well being tested. In any event, the volume of fluid receiving chamber 54 should be such that well fluid entering the chamber through perforated tubing 44 will be balanced against pressure transmitting fluid maintained in tubing 36 and prevent the entry of the well fluid into tubing 36, irrespective of the pressure extremes to be measured. Stated differently, the length of tubing section 34, forming fluid receiving chamber 54, will be such that the level of well fluid within chamber 54 will be below the bottom of tubing 36 at the highest pressure to be measured and above the passage through mounting means 48 at the lowest pressure to be measured. In order to further prevent debris, which may have passed screen 50, from accidentally entering tubing 36, a filter 56 is mounted on the bottom of annular mounting means 52 and over the open end of tubing 36. In the preferred embodiment the filter 56 is a glass frit filter.

As previously indicated, testing means 14 is run into and out of the well, in the preferred embodiment, through a well control means such as the stuffer box 16. The stuffer box 16 is provided with packer means 18 which includes resilient packer 58 and compression nut 60. After passing through the stuffer box 16 the tubing means 14, as shown in FIG. 1, may pass over sheaves 20 and 22 and about reel 24 and thence to the pressure transmitting fluid source 26 and the control and measuring means 28. Adjacent the control and measuring means 28 and the pressure transmitting fluid supply means 26, the tubing means 14 terminates an upper section 42. Mounted in upper section 42 is an annular sleeve means 62 provided with a nipple 64 through which tubing 36 may pass. The nipple 64 could be mounted in the upper end of tubing 34 rather than through the side thereof. The upper end of tubing 34 may be open or sealed as desired. Inasmuch as the lower end of tubing 36 is sealed in tubing 34 at intermediate section 40, the annular space between tubing 34 and tubing 36 may be utilized to dispose therein a protective fluid, a weighting fluid or another appropriate fluid, depending upon the preference of the manufacturer and the operator. For example, the protective fluid may be utilized to absorb heat from the well environment and thereby protect the inner tubing 36. It may also be a fluid which will protect the tubing 36 from pressure conditions in the well, thereby permitting use of a relatively inexpensive tubing made of plastic or thin metal. Likewise, with a protective fluid in the annular space between tubing 36 and tubing 34, tubing 34 may also be made of a thinner metal. A fluid disposed in the annular space between tubing 34 and tubing 36 may also serve as a weighting material to add weight to the tubing means 14 and thereby facilitate its introduction into the well.

By way of specific example the following dimensions will illustrate the details of a preferred embodiment. The tubing 34 may conveniently be tubing of carbon steel or stainless steel where severe well conditions are to be encountered. The tubing, as previously indicated, should be flexible and for example would be one inch in outside diameter. The section making up fluid receiving chamber 54 could, for example, be 10 feet in length in order to provide a sufficiently large chamber to accommodate the variations in pressure to be encountered in a producing well such as a geothermal well. The tubing 36 can conveniently be tubing having an outside diameter of about 0.1 inch. Such tubing is often referred to as microtubing or capillary tubing.

The surface equipment for measuring the pressure of the pressure transmitting fluid in tubing 36 is shown schematically in FIG. 2. The tubing 36 which is exposed at the surface is preferably insulated. Pressure transmitting fluid may be charged to tubing 36 through branch line 66 and valve 68 from a supply source, such as a source of nitrogen 26. If desired, tubing 66 may be connected by a quick disconnect means to make the equipment truly portable. Pressure transmitting fluid is also passed to the pressure measuring apparatus through tubing 70 and valuve 72. Again, the connection of tubing 70 to tubing 36 can be a quick connect means to aid in the portability and facilitate the use of the equipment. Pressure transmitting fluid transmitted through line 70 passes to pressure transmitting fluid chamber 74. Pressure transmitting fluid chamber 74 is mounted in constant temperature bath 76. Pressure gauge 78 is mounted in pressure transmitting fluid chamber 74 and the sensed pressure is transmitted through line 80 to pressure recorder 82. Pressure gauge 78 and recorder through line 80 to pressure recorder 82. Pressure gauge 78 and recorder 82 are, for example, a Hewlitt Packard Unit including Pressure Signal Processor Model 2816A, Digital Analog Converter Model 581A, Preset Counter Model 5330A, Strip Chart Recorder Model 680, and Thermal Printer Model 5150A. When utilized in sensing the pressure at a geothermal well, the temperature of constant temperature bath 76 may, for example, be maintained at about 100° F.

Figure 3:
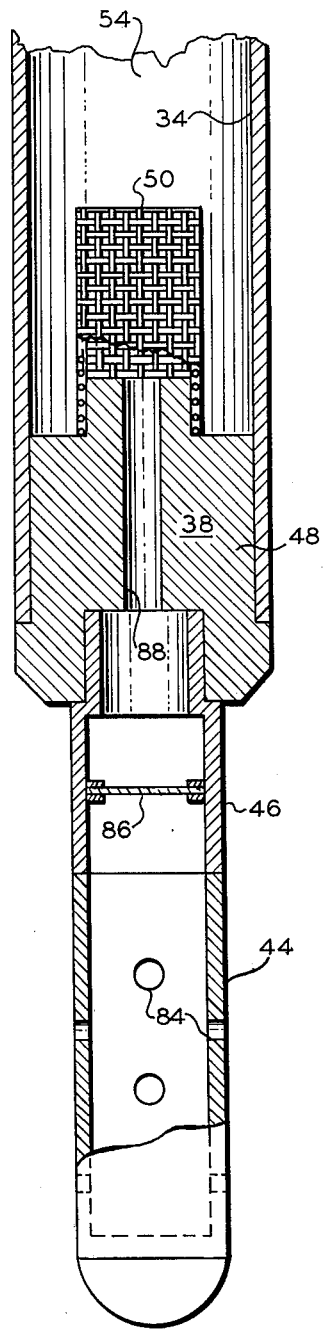
FIG. 3 is an enlarged view partially in cross section of the lower portion of the apparatus of the present invention.
Figure 4:
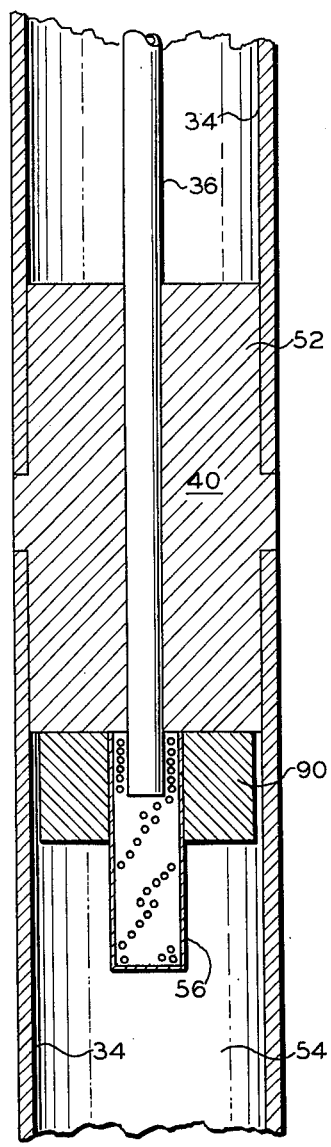
FIG. 4 is an enlarged view partially in cross section of the intermediate portion of the apparatus of the present invention.
Figure 5:
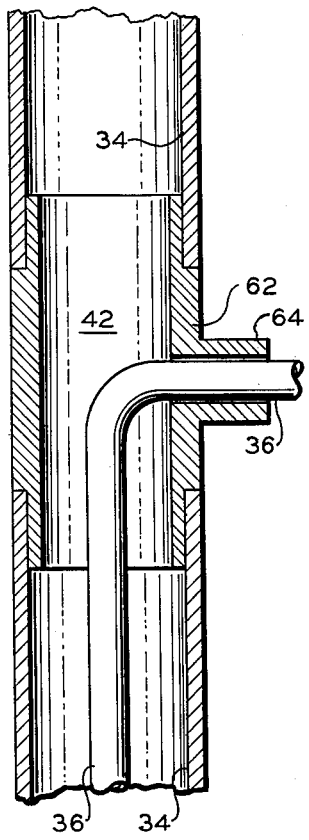
FIG. 5 is a cross-sectional view partially in section of the upper portion of the apparatus of the present invention.

FIGS. 3, 4, and 5 illustrate in somewhat more detail the lower portion 38, intermediate portion 40 and upper portion 42, respectively, of the pressure sensor tubing means 14.

As shown in FIG. 3, nose tube 44 is provided with holes or perforations 84 to admit well fluid to the apparatus. Pressure responsive closure means 46 is provided with frangible disc 86 and generally can be obtained as a unit. Pressure responsive closure means 46 may be welded or screwed into connecting cylinder 38 and connected to nose tube 44 in a similar manner. Connecting cylinder 38 is provided with a central bore 88 to permit well fluid to pass into chamber 54 formed by tubing 34. Screen means 50 may be placed over a reduced diameter portion of connecting cylinder 38 and welded to or otherwise suitably attached. Connecting cylinder 48 is also suitably welded to tubing 34.

In FIG. 4 connecting cylinder 52 of intermediate section 40 is also welded to tubing sections 34 and has weided or otherwise sealed therein, through a central bore thereof, smaller tubing or capillary tubing 36. A nut means 90 may be welded to the lower portion of connection cylinder 40 to accommodate the end of tubing 36 and glass frit filter 56 may be welded, screwed or otherwise mounted in nut 90.

Connecting sleeve 62, (FIG. 5) of upper portion 42 is suitably welded to sections of tubing 34.

In the preferred method of utilizing the apparatus of the present invention, a pressure transitting fluid is charged to the tubing 36 and chamber 54 at the surface of the earth and sealed therein. The pressure sensing tubing means 14 is then run into the well to the depth at which the pressure is to be measured through a well control means, such as a stuffer box to the extent the well is on production, or can also be mounted in the well prior to cementing and perforating the casing in the well. When the tubing 14 has been run to the desired depth, the pressure on the pressure transmitting fluid is increased to rupture frangible disc 86. Well fluids in nose tube 44 are then admitted to chamber 54 until a pressure balance is attained and the system becomes stabilized. The recording equipment is then connected to tubing 64 and the pressure measured. By way of illustration, apparatus, constructed in accordance with the drawings, was run in a geothermal well to a depth of about 1822 feet. Since the well was on production the tubing was run through a conventional stuffer box apparatus. Bottom hole temperature was in the neighborhood of 350° F. The pressure of the pressure transmitting fluid ($N_2$) was increased to a pressure of about 2100 psig to rupture the frangible disc. The test was run for 5 days and pressure variations between 823.22 psig and about 890.20 psig were measured.

While specific illustrations and specific exampls have been given herein by way of illustration, it is to be understood that such specific recitals are not to be considered limiting.

What is claimed is:

1. Pressure sensing apparatus for sensing the pressure of a well fluid in a subsurface well comprising:
    (a) first elongated tubing means adapted to be disposed in a well with its lower end at a subsurface location at which the pressure of the well fluid is to be sensed and its upper end at the surface of the earth;
    (b) fluid receiving chamber means disposed on the lower end of said first tubing and having at least one opening in its lower end adapted to permit said well fluid at said subsurface location to enter said fluid receiving chamber;
    (c) second elongated tubing means, of smaller cross section than said first tubing means, disposed within said first tubing means with its upper end at the surface of the earth and its lowr end sealed within one of (1) the lower end of said first tubing or (2) the upper end of said fluid receiving chamber above said at least one opening in said fluid receiving chamber and adapted to receive a pressure transmitting fluid and to be placed in fluid communication with said fluid receiving chamber; and
    (d) pressure responsive closure means above said at least one opening in said fluid receiving chamber and closing one of (1) the lower end of said fluid receiving chamber, (2) the upper end of said fluid receiving chamber or (3) the lower end of said second tubing and adapted to open at a pressure above the pressure of said well fluid, thereby placing said second tubing in fluid communication with said fluid receiving chamber and to permit the pressure of said well fluid to be balanced against the pressure of said pressure transmitting fluid within said fluid receiving chamber.

2. Apparatus in accordance with claim 1 wherein the apparatus is adapted to be run into a well in its fluid producing mode.

3. Apparatus in accordance with claim 2 wherein the apparatus is adapted to be run into the well through a well control means.

4. Apparatus in accordance with claim 3 wherein the well control means is a stuffer box means.

5. Apparatus in accordance with claim 2 wherein the first and second tubings are flexible tubings.

6. Apparatus in accordance with claims 1, 2, 3, 4, or 5 wherein the fluid receiving chamber is formed as a section of the first tubing.

7. Apparatus in accordance with claim 6 wherein the lower end of the second tubing is annularly sealed in the first tubing adjacent the upper end of the fluid receiving chamber.

8. Apparatus in accordance with claim 6 wherein the closure means is a frangible sealing means adapted to be ruptured at a pressure above the pressure of the well fluid.

9. Apparatus in accordance with claim 6 wherein the second tubing and the fluid receiving chamber have a gaseous pressure transmitting fluid disposed therein prior to the opening of the closure means.

10. Apparatus in accordance with claim 6 wherein the second tubing and an upper portion of the fluid receiving chamber have disposed therein after opening of the closure means a gaseous pressure transmitting fluid.

11. Apparatus in accordance with claim 6 wherein the pressure responsive closure means is mounted adjacent the lower end of the fluid receiving chamber.

12. A method for sensing for fluid pressure at a subsurface location in a subsurface well, comprising:
    (a) disposing a pressure transmitting fluid in a first elongated tubing means which in turn is disposed within a second elongated tubing means, having a cross section larger than said first tubing and terminating in a fluid receiving chamber, having its upper end adapted to communicate with the lower end of said first tubing and its lower end adapted to communicate with the fluids in the well, and well fluids are prevented from entering said first tubing by a pressure responsive closure means which opens in response to a fluid pressure greater than the pressure of said well fluid;
    (b) increasing the pressure of said pressure transmitting fluid to a pressure sufficient to open said closure means;
    (c) balancing the pressure of the well fluids against the pressure of the pressure transmitting fluid within the said fluid receiving chamber and stabilizing the fluid system at said balanced pressure; and
    (d) sensing the pressure of said pressure transmitting fluid at the surface of the earth, as transmitted to the surface of the earth by the pressure applied to said pressure transmitting fluid by said well fluid in said fluid receiving chamber.

13. A method in accordance with claim 12 wherein the subsurface well is in its fluid producing mode during the conduct of the pressure sensing method.

14. A method in accordance with claim 12 wherein the first and second tubing and the fluid receiving chamber are adapted to be run into the well when said well is in its fluid producing mode and said fluid receiving chamber and said second tubing are run into said well after disposing the pressure transmitting fluid in the first tubing and before increasing the pressure of said pressure transmitting fluid.

15. A method in accordance with claim 14 wherein the fluid receiving chamber and the second tubing are run into the well through a well control means.

16. A method in accordance with claim 15 wherein the well control means is a stuffer box means.

17. A method in accordance with claim 12 wherein the pressure transmitting fluid is sealed in the first tubing prior to running the first and second tubing and the fluid receiving chamber into the well.

18. A method in accordance with claim 12, 13, 14, 15, 16 or 17 wherein the pressure transmitting fluid is a gas.

19. A method in accordance with claim 12, 13, 14, 15, 16 or 17 wherein the first and second tubings are flexible tubing.

* * * * *